(12) United States Patent
Aziz et al.

(10) Patent No.: US 9,143,367 B2
(45) Date of Patent: Sep. 22, 2015

(54) CLOCK AND DATA RECOVERY ARCHITECTURE WITH ADAPTIVE DIGITAL PHASE SKEW

(71) Applicant: LSI Corporation, San Jose, CA (US)

(72) Inventors: Pervez M. Aziz, Dallas, TX (US);
Amaresh V. Malipatil, San Jose, CA (US); Viswanath Annampedu, Schnecksville, PA (US)

(73) Assignee: AVAGO TECHNOLOGIES GENERAL IP (SINGAPORE) PTE. LTD. (SG)

( * ) Notice: Subject to any disclaimer, the term of this patent is extended or adjusted under 35 U.S.C. 154(b) by 48 days.

(21) Appl. No.: 13/955,676

(22) Filed: Jul. 31, 2013

(65) Prior Publication Data
US 2015/0016497 A1    Jan. 15, 2015

Related U.S. Application Data

(60) Provisional application No. 61/845,563, filed on Jul. 12, 2013.

(51) Int. Cl.
*H04L 25/03*    (2006.01)

(52) U.S. Cl.
CPC . *H04L 25/03057* (2013.01); *H04L 2025/03598* (2013.01)

(58) Field of Classification Search
CPC .................................................. H04L 25/03057
USPC ................... 375/354, 355, 229, 230, 232, 233
See application file for complete search history.

(56) References Cited

U.S. PATENT DOCUMENTS

| | | | | |
|---|---|---|---|---|
| 5,805,619 | A * | 9/1998 | Gardner et al. | 714/814 |
| 2005/0232383 | A1 * | 10/2005 | Sommer | 375/350 |
| 2008/0001797 | A1 * | 1/2008 | Aziz et al. | 341/118 |
| 2010/0329326 | A1 * | 12/2010 | Aziz et al. | 375/233 |
| 2010/0329677 | A1 * | 12/2010 | Kaneda et al. | 398/65 |

* cited by examiner

*Primary Examiner* — Kevin M Burd
(74) *Attorney, Agent, or Firm* — Sheridan Ross P.C.

(57) ABSTRACT

In described embodiments, a method for producing sample decisions with a digital signal processing-based SERDES device includes converting an analog signal to a digital signal, equalizing the digital signal, selecting inputs for a phase detector in a main CDR loop, computing a phase difference signal, producing a phase skew to signals for a last equalization stage by a first interpolation filter bank, generating a control signal to control the phase provided by the first interpolation filter bank by a phase skew adaptation loop, and updating the phase skew values to generate a resulting decision. A device includes a first interpolation filter bank inserted between the equalization stages is configured to generate phase skew signals to a last equalization stage and a phase skew loop responsive to the last equalization stage is configured to adjust the phase skew provided by the first interpolation filter bank.

20 Claims, 6 Drawing Sheets

CLOCK AND DATA RECOVERY ARCHITECTURE WITH ADAPTIVE DIGITAL PHASE SKEW

CROSS REFERENCE TO RELATED APPLICATIONS

This application claims priority to U.S. Provisional Patent Application Ser. No. 61/845,563 filed on Jul. 12, 2013, the teachings of which are incorporated herein in its entirety by reference.

BACKGROUND

In many applications, including digital communications, clock and data recovery (CDR) systems are employed to recover correct timing (i.e., frequency and phase) of an input data stream. This timing information is then employed to sample the input data stream to receiver the user data for decoding. A serializer/deserializer (SERDES) device is commonly used in high speed communications to convert data between serial and parallel interfaces in each transmit/receive direction.

SERDES devices often employ an encoding scheme that supports DC-balance, provides framing, and guarantees signal transitions. Guaranteed transitions allow a receiver to extract the embedded clock signal, while control codes allow framing, typically on the start of a data packet. This encoding scheme also improves error detection with running disparity, providing separation of data bits from control bits, and permits derivation of byte and word synchronization.

Future generations of the SERDES are likely to move to digital signal processing (DSP)-based architectures which perform more data path signal processing than conventional analog SERDES devices. In both digital and analog types of SERDES, there is usually a variable gain amplifier (VGA) followed by an analog equalizer (AEQ). The VGA and AEQ together form an analog front end (AFE) which provides for gain control as well as some level of analog equalization/higher frequency peaking or group delay compensation. A conventional analog SERDES communication channel is shown in FIG. 1 of U.S. patent application Ser. No. 13/288,096, filed Nov. 3, 2011, incorporated by reference herein in its entirety.

In contrast to an analog SERDES implementation such as that described in the above-referenced patent application, in a DSP-based architecture, the AFE is followed by an analog to digital converter (ADC) which produces quantized or digital samples at a symbol or baud rate. These finite precision samples are subsequently processed further for equalization using a digital feed-forward equalizer (FFE) or digital decision feedback equalizer (DIGDFE). The DIGDFE equalized signal may be followed by a final digital slicing operation to provide the final decisions. For non-return to zero (NRZ) transmitted data modulation, the data slicing produces binary symbol decisions 1, −1 (or 1, 0 in unipolar notation). For pulse amplitude 4 level (PAM4) modulation the data slicing produces 4 level symbol decisions 3, 1, −1, −3. Depending on the DIGDFE, the final decisions may be produced inherently as part of the DIGDFE equalization process and an additional data slicer may not be needed.

In addition to equalization, the SERDES performs clock/data recovery (CDR) to recover phase and frequency offsets and determine where symbol or baud spaced samples should be taken. In an analog SERDES, for example, a bang-bang phase detector (BBPD) is followed by a digital loop filter and a clock generation element to determine what phase the recovered clock should sample the analog signal at the output of the AFE. The clock generation element could be an analog phase interpolator (API), a phase selection circuit (PSC) or a phase mixer (PM), or a voltage controlled oscillator (VCO). The BBPD includes various slicers or latches which quantize the sampled analog signal and use these slicer outputs to compute a timing gradient estimate which drives the digital loop filter. Note that the BBPD for the analog SERDES requires two separate physical clocks, a data clock and a transition clock, which is phase offset by 0.5 T or half a symbol period from a main data clock.

CDR needs to be performed for the DSP-based SERDES as well in this case the recovered clock determines the sampling phase for the ADC. The ADC output samples can be used to drive a digital phase detector (PD). In the DSP-based SERDES, there generally is no transition clock, only a data clock.

There is a tradeoff between CDR latency and optimal sampling. An DSP implementing equalization functions incurs delay or latency. This means that the later in the equalization chain the data/error signals are obtained from, the more latency is incurred in providing these signals to the CDR phase detector, thus degrading the dynamic performance behavior of the CDR. The system robustness might be degraded accordingly in terms of bit error rate or jitter tolerance performance.

On the other hand, the last equalization stage is used to obtain the final data decisions. If these decisions or any other signals obtained from the last equalization stage are used to create the phase detector input, the recovered clock sampling phase determined by the CDR might provide higher quality or more robust final decisions. Thus, there is a tradeoff between the CDR dynamic performance behavior with better dynamic performance obtained with smaller latency signals derived earlier in the equalization chain verses the improvement of CDR sampling phase (or its mean/average value) quality or accuracy by using higher latency signals derived later in the equalization chain. Both the dynamic CDR performance and sample phase mean affect the bit error rate robustness of the SERDES system.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

DETAILED DESCRIPTION

Described embodiments relate to a device and method for performing clock and data recovery for DSP-based SERDES.

Hereinafter, embodiments are described with reference to the drawings.

Note that herein, the terms "signal", "sample" and "decision" may be used interchangeably. It is understood that a signal may correspond to, or relate to a sample, or a decision, and that the sample or the decision may refer to the signal.

The following detailed description utilizes a number of acronyms, which are generally well known in the art. While definitions are typically provided with the first instance of each acronym, for convenience, Table 1 provides a list of the acronyms and abbreviations used along with their respective definitions.

TABLE 1

| SERDES | serializer/deserialier | PD | phase detector |
|---|---|---|---|
| CDR | clock and data recovery | LF | loop filter |
| DSP | digital signal processor | API | analog phase interpolator |
| AFE | analog front-end | MUX | multiplexor |
| FFE | feed-forward equalizer | MMPD | Mueller-Mueller phase detector |
| DIGDFE | digital decision feedback equalizer | SLTPD | slope table based phase detector |
| DIF | digital interpolation filter | BBPD | bang-bang phase detector |
| ADC | analog to digital converter | OLPD | quasi-linear phase detector |
| VGA | variable gain amplifier | FIR | finite impulse response |
| AEQ | analog equalizer | LUT | look up table |

Figure 1:
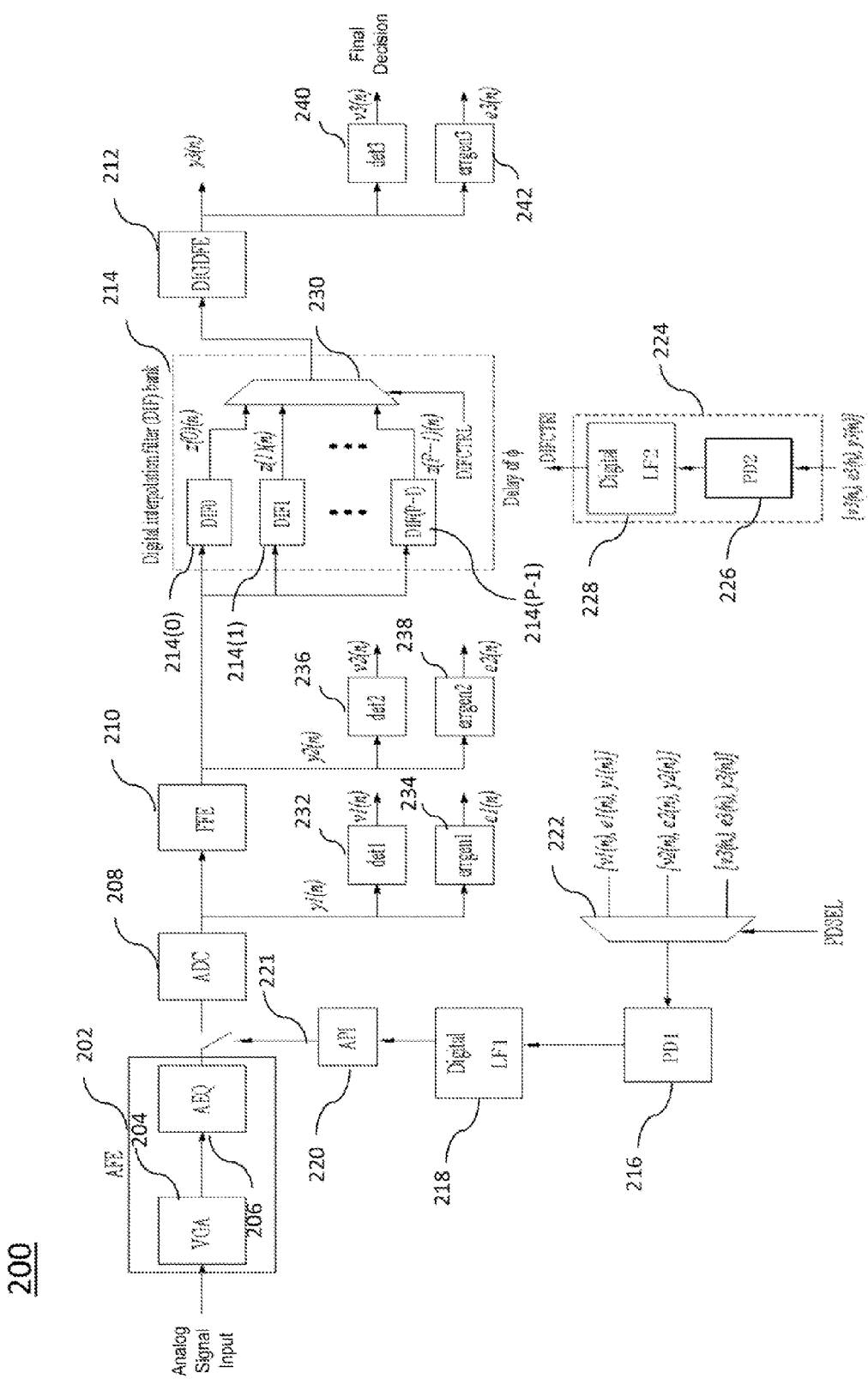
FIG. 1 shows a simplified block diagram of a DSP-based SERDES device with a digital interpolation filter (DIF) bank phase ($\phi$)—adapted by a secondary phase skew adaptation loop in accordance with embodiments.

FIG. 1 shows a simplified block diagram of a DSP-based SERDES device with a digital interpolation filter (DIF) bank phase ($\phi$)—adapted by a secondary phase skew adaptation loop. As shown, SERDES device 200 includes an analog front-end (AFT) 202 formed by a variable gain amplifier (VGA) 204 and an analog equalizer (AEQ) 206, an analog to digital converter (ADC) 208, a feed-forward equalizer (FFE) 210, a digital decision-feedback equalizer (DIGDFE) 212, a digital interpolation filter (DIF) bank 214, a phase detector (PD)1 216, a digital filter LF1 218, an analog phase interpolator (API) 220, a multiplexor (MUX) 222, and a secondary phase skew adaptation loop 224. A received analog signal is filtered or equalized by VGA 204 and AEQ 206 in AFE 202. In one embodiment, the AFE 202 is similar to that shown and described in the aforementioned patent application. AFE 202 is followed by ADC 208 that, in response to a data clock 221 from API 220, produces quantized or digital samples at a symbol or baud rate T. These digital samples are subsequently processed further for equalization using FFE 210 and DIGDFE 212 that are connected in cascade. Outputs of various equalization stages, i.e., ADC 208, FFE 210, and DIGDFE 212, are each forwarded to a slicer (i.e., det1 232, det2 236, or det3 240) to digitize its output decision and an error generator (i.e., errgen1 234, errgen2 238, or errgen3 242) to compute its error signal, respectively.

SERDES device 200 is a computer-related entity, either hardware, a combination of hardware and software, software, or software in execution. Portions of the SERDES device 200 may be implemented using one or more software programs. The components of SERDES device 200 are implemented separately or implemented in a variety of combinations.

Referring to FIG. 1, the outputs of the various equalization stages at symbol time n are as follows:

y1($n$) is an output from ADC 208;
y2($n$) is an output from FFE 210; and
y3($n$) is an output from digital DFE 212.

The corresponding data detector or digitally sliced values are denoted as v1($n$) is a sliced decision obtained from the output of ADC 208;
v2($n$) is a sliced decision obtained from the output of FFE 210; and
v3($n$) is a sliced decision obtained from the output of digital DFE 212.

The slicers are denoted by slicers' generic names det1, det2, det3 shown in FIG. 1. Slicers det1 232, det2 236, and det3 240 can be implemented as a slicer-latch (i.e., a decision device based on an amplitude threshold and a latch to hold the results of the decision device) or a more complicated detector such as a sequence detector. For high-speed applications, slicers det1 232, det2 236, and det3 240 each is often implemented as a slicer-latch that is clocked by a CDR-generated clock (not shown). In addition to sampling the data signal, slicers det1 232, det2 236, and det3 240 essentially quantize the input signal thereto as a binary "1" or "−1" based on the sampled analog value and a slicer threshold, $s_t$. If the input to det1 232, det2 236, or det3 240 at time n is y(n), then the detected data bit output, v(n) of det1 232, det2 236, det3 240, det4 304 (FIG. 4), or det5 306 (FIG. 3) is given as follows:

$v(n)=1$ if $y(n)>s_t$ $v(n)=-1$ otherwise.

It is understood that the above also applies to signals subject to the function slicer[ . . . ]. For example, v(n)=slicer[y(n)] also yields the above results.

At the output of each stage, i.e., ADC 208, FFE 210, and DIGDFE 212, an error signal is defined. The error signal represents a discrepancy between an actual equalized signal and what one would expect in the absence of channel impairments such as intersymbol interference and noise.

The error signals, e1($n$), e2($n$), and e3($n$), respectively, are computed by an error signal generator, i.e., errgen1 234, errgen2 238, or errgen3 242, respectively. In one embodiment, the error signal generators, errgen1 234, errgen2 238, or errgen3 242 for computing e1($n$), e2($n$), and e3($n$) are described with the following equations:

$$e1(n)=y1(n)-v1(n) \quad (1)$$

$$e2(n)=y2(n)-v2(n) \quad (2)$$

$$e3(n)=y3(n)-v3(n) \quad (3)$$

MUX 222, in response to control signal PDSEL, selects one set of phase detector inputs out of three sets of outputs from ADC 208, FFE 210, and DIGDFE 212 and forwards the one set of the phase detector inputs to PD1 216 which, in combination with digital filter LF1 218, computes a required sample phase for API 220. API 220 provides the selected data clock 221 phase to ADC 208.

Here, ADC 208, FFE 210, PD1 216, digital LF1 218, API 220, and MUX 222 form a main CDR loop. The digital filter 218 is typically a second order loop filter designed to recover both phase and frequency but might be a higher or lower order filter as needed.

In this embodiment, MUX 222 determines which equalization stage is used to drive PD1 216 that allows for tradeoff between CDR dynamic performance and sample phase accuracy on a per-application basis.

For an application more sensitive to CDR dynamic performance than final sample phase accuracy, SERDES device 200 is configured to have MUX 222 control signal PDSEL set such that the output signals y1(n), v1(n), e1(n) of ADC 208 are used to drive PD1 216. In this case, assuming use of a conventional Mueller-Mueller phase detector (MMPD) or a conventional slope-table phase detector (SLTPD) for PD1, the MMPD and SLTPD for PD1 216 works as follows where Δ(n) is PD1 216 output.

$$\Delta_{MMPD}(n) = y1(n)v1(n-1) - y1(n-1)v1(n) \quad (4)$$

$$\Delta_{SLTPD}(n) = e1(n)[v1(n) - v1(n-2)] \quad (5)$$

For an application less sensitive to CDR dynamic performance but requiring better optimal final sample phase, the PDSEL can be set to select the output signals y3(n), v3(n), e3(n) from DIGDFE 212 and the outputs of PD1 216 for the MMPD and SLTPD take the following equations:

$$\Delta_{MMPD}(n) = y3(n)v3(n-1) - y3(n-1)v3(n) \quad (6)$$

$$\Delta_{SLTPD}(n) = e3(n)[v3(n) - v3(n-2)] \quad (7)$$

Thus, SERDES device 200 allows for different applications to be configured differently based on a desired tradeoff between CDR dynamic performance and the accuracy of the recovered clock sample phase mean value. As shown in FIG. 1, the main CDR loop operates with the signals (i.e., [y1(n), v1(n), e1(n)], [y2(n), v2(n), e2(n)] and [y3(n), v3(n), e3(n)]) derived from ADC 208 and equalization stages (i.e., FFE 210 and DIGDFE 212). In one embodiment, the main CDR loop operates with lower latency signals (i.e., [y1(n), v1(n), e1(n)], [y2(n), v2(n), e2(n)]) derived from ADC 208 and an earlier equalization stages (i.e., FFE 210).

DIF bank 214 is inserted between FFE 210 and DIGDFE 212 to provide a phase skew or shift to equalized signals from FFE 210, the amount of phase shift having a value, ϕ, and passed to DIGDFE 212. DIF bank 214 allows SERDES device 200 to overcome the tradeoff between CDR dynamic performance and the accuracy of the recovered clock sample phase mean, and allows a final effective sample phase of the later equalization stages, e.g., DIGDFE 212, to be closer to an optimal phase for that equalization stage.

DIF bank 214 includes a bank of digital filters (DIFs), such as DIF0 214(0), DIF1 214(1), . . . , DIF(P−1) 214(P−1), connected in parallel. DIF bank 214 might include 16, 64, 128, or more DIF filters. DIF bank 214 also includes mux 230 that selects one phase skew value, ϕ, to DIGDFE 212. The amount of phase skew, ϕ, is a fractional value between 0 and T (one symbol period). Multiple values of ϕ are realized by using a bank of DIFs including P DIFs. The digital phase skew value, ϕ, can be realized with DIF bank 214 that processes its incoming signal with the digital filters, DIF0 214(0), DIF1 214(1), . . . , DIF(P−1) 214(P−1). An output sample stream for the ith DIF is z(i)(n) where i=0, 1, . . . P−1. For example, if there are 16 DIFs in DIF bank 214, then P=16, ϕ=iT/P=iT/16. Mux 230, whose control signal is denoted by DIFCTRL, allows for a selection of ϕ that changes a sample phase for better CDR sample phase for the final equalization stage. In this embodiment, if PDSEL for MUX 222 is chosen to select one or more signals from the set y1(n), e1(n), v1(n), the CDR may work with these low latency decisions yet ϕ may be chosen/programmed to yield the phase needed by DIGDFE 212 to yield better performance. Note only one digital filter in the DIF bank needs to operate at any given time, thus the power dissipation of DIF bank 214 does not rise higher than that of one digital filter. Also, high latency signals v3(n), e3(n), y3(n) are no longer need to drive mux 222 for PD1 216. Thus, mux 222 might select a signal for PD1 216 between the lower latency signals v2(n), e2(n), y2(n) or v1(n), e1(n), y1(n), and the digital phase skew, ϕ, is used to provide better sampling for DIGDFE 212.

Here, in one embodiment, each DIF in DIF bank 214 is implemented as a finite impulse response (FIR) filter. A FIR filter with M tap weight coefficients g(l) computes its output samples y(n) from FIR's input samples as follows:

$$y(n) = \sum_{l=0}^{M-1} g(l)x(n-l) \quad (8)$$

Then, as an example, the ith DIF bank output z(i)(n) is computed by $$x(i)(n) = \sum_{l=0}^{M-1} g(i)(l)x(n-l) \quad (9)$$

where g(i)(l) represents the lth coefficient of the ith DIF. In one embodiment, an implementation of the filters DIF0 214(0), DIF1 214(1), . . . , DIF(P−1) 214(P−1) can be found in "Splitting Tools for Fractional Delay Filter Design" by Laakso et al., IEEE Signal Processing Magazine, January 1996, pp. 30-60, incorporated herein by reference in its entirety. In an alternative embodiment, each DIF may be implemented as an infinite impulse response (IIR) filter. In one embodiment, the phase skew provided by DIF0 is approximately zero, i.e., no significant phase skew is provided DIF0.

Secondary phase skew adaptation loop 224 includes second phase detector (PD2) 226 and second digital loop filter (LF2) 228 allowing for adapting the phase skew value, ϕ. Here, PD2 226 may or may not be the same as PD1 216 in the main CDR loop. The CDR loop filter LF1 218 is typically a second order loop filter designed to recover both phase and frequency. In one embodiment, the digital phase skew loop filter, LF2 228, is a first order loop filter but might be a higher order filter. In the embodiment shown in FIG. 1, secondary digital phase skew loop 224 is configured to use signals, v3(n), e3(n), y3(n), from the last equalization stage, i.e., DIGDFE 212 to generate a control signal DIFCTRL for DIF bank 214. The DIFCTRL signal might be generated from the most significant bits of an accumulator (not shown) used to implement the digital filter LF2 228.

In one embodiment, PD2 226 is implemented in different forms such as the MMPD or SLTPD. Although secondary phase skew adaptation loop 224 has a large latency due to a need for one or more signals from v3(n), e3(n), y3(n), this does not affect the latency of the main CDR and thus the dynamic performance behavior of the main CDR. If PD2 226 is implemented as one MMPD or SLTPD, the following two equations describe the operation of PD2 226 as the MMPD or SLTPD, respectively.

$$\Delta_{PD2, MMPD}(n) = y3(n)v3(n-1) - y3(n-1)v3(n) \quad (10)$$

$$\Delta_{PD2, SLTPD}(n) = e3(n)[v3(n) - v3(n-2)] \quad (11)$$

Here, all filters in DIF bank 214 need not operate simultaneously, only one is needed once the ϕ converges to its desired value. Since the rate ϕ changes depends on how fast ϕ is adapted (as can be set by programming LF2 228 parameters appropriately), in one embodiment three filters may operate simultaneously to ensure that there are no data sample discontinuities when the ϕ (and thus mux 230) switches sequentially one value to the next. The three filters may be three adjacent filters. This may be done as follows. Suppose ϕ(n) corresponds to DIF bank 214 with sample stream z(l). Then if DIF bank filters z(l−1) and z(l+1) are operated, then if the ϕ ever changes to correspond to these sample streams and filters, the switchover occurs in a graceful manner. For l=0 and l=P−1, the l−1 and l+1 indices are considered in a modulo P manner.

Digital Oversampled BBPD for PD2

Figure 2:
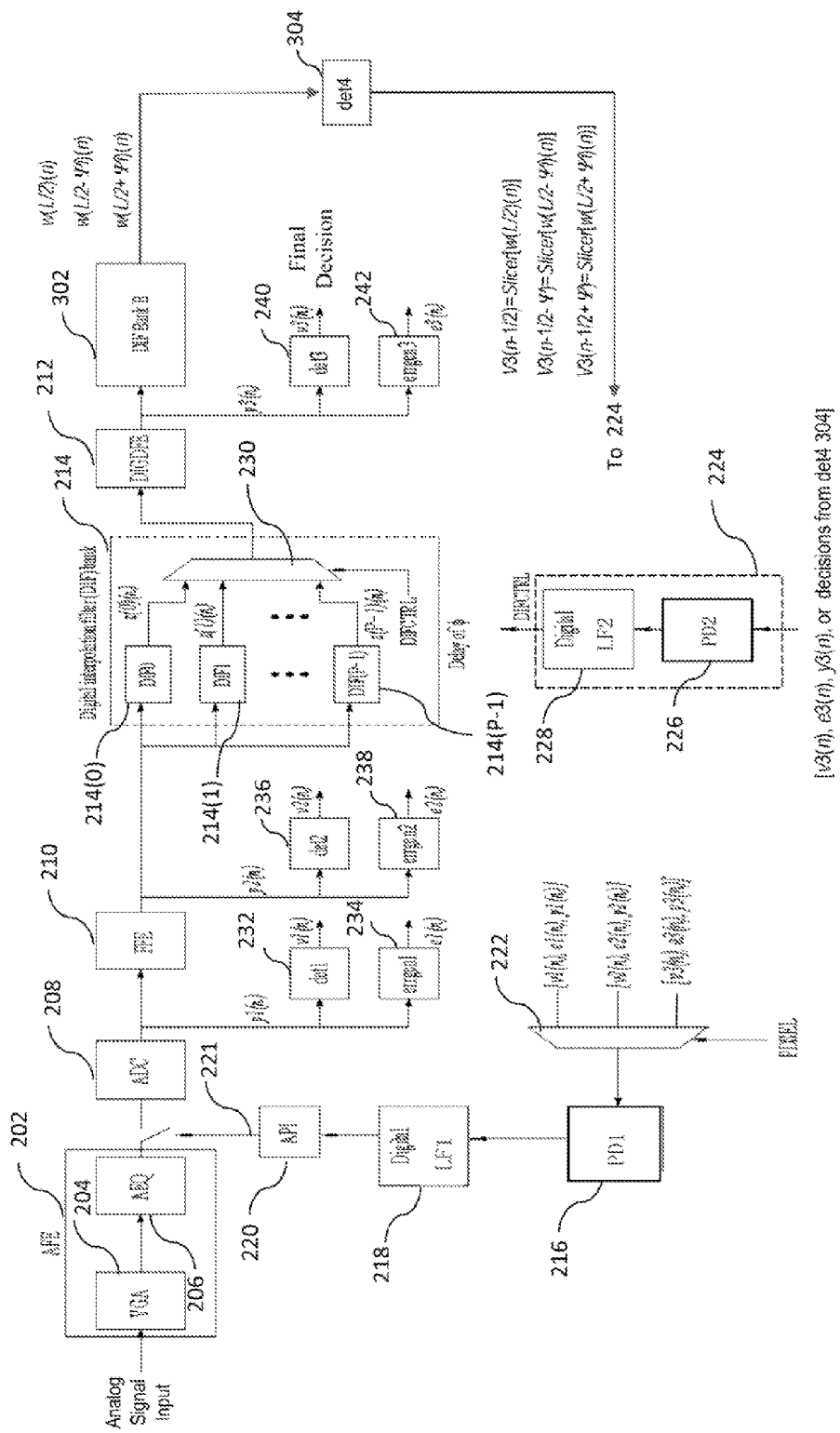
FIG. 2 shows a simplified block diagram of a DSP-based SERDES device shown in FIG. 1 with an additional DIF Bank and a digital bang-bang phase detector (BBPD) or a digital pseudo quasi-linear phase detector (QLPD) in the secondary phase skew adaptation loop in accordance with embodiments.

As described above, an analog SERDES using a BBPD requires separate data and transition clocks which produce data and transition samples from the analog waveform. However, a DSP-based SERDES does not inherently have a transition clock available. In one embodiment, a phase detector in a secondary phase skew adaption loop is a digital oversampled bang-bang phase detector. FIG. 2 shows a block diagram of a DSP-based SERDES device shown in FIG. 1 with a digital BBPD for the phase detector PD2 226 in the secondary phase skew adaptation loop 224 to adapt the phase skew ϕ. The difference between FIG. 1 and FIG. 2 is that, besides PD2 226 being a BBPD, an additional DIF bank, DIF bank B 302, and a slicer det4 304 are added after DIGDFE 212 in FIG. 2.

DIF bank B 302 might be of the same design as the DIF bank 214 and might include 16, 64, or 128 or more DIF filters. DIF bank B 302 emulates transition clock samples for DIGDFE 212. This transition sample emulation enables the use of a digital BBPD for PD2 224.

A traditional analog BBPD implemented in an analog CDR uses a decision estimate v(n), a prior estimate v(n−1) (obtained by simply delay v(n) by 1 symbol period T) and a "transition" decision v(n−½) which represents the slicer decision made at a sampling phase 0.5 T offset from the main data sample. The sample phase offset is realized through input and output recovered clocks where the input clock samples the data and the output clock samples the transition. The analog BBPD is categorized as a 2× oversampled phase detector due to the use of the transition sample. The analog BBPD (i.e., ABB) is described as $$\Delta_{ABB} = \text{LUT}[v(n-1), v(n-½), v(n)] \quad (12)$$

where LUT refers to a well-known BBPD look up table as shown in Table 1.

TABLE 1

BBPD look up table (LUT).

| v(n − 1) | v(n − ½) | v(n) | PDOUT |
|---|---|---|---|
| −1 | −1 | −1 | 0 (no data transition) |
| −1 | −1 | 1 | −1 |
| −1 | 1 | −1 | 0 |
| −1 | 1 | 1 | 1 |
| 1 | −1 | −1 | 1 |
| 1 | −1 | 1 | 0 |
| 1 | 1 | −1 | −1 |
| 1 | 1 | 1 | 0 (no data transition) |

Although the 1-1 1/-1-1 1 entries should not be encountered, they can be set to either 1 or 0 for improved performance. In FIG. 2, there is only one baud rate recovered clock, no oversampled clocks, and thus no direct access to a transition sample. However, using DIF Bank B 302, an estimate for the final stage equalized sample y3(n) transition sample with 0.5 T phase offset can be obtained. This signal corresponds to one of outputs of DIF Bank B 302. As shown in FIG. 2, if the L/2th signal of DIF Bank B 302 corresponds to the transition sample for y3(n), i.e. w(L/2)(n) corresponds to y3(n−½), w(L/2)(n) is sliced to produce the resulting decision v3(n−½)

$$v3(n-½) = \text{slicer}[w(L/2)(n)] \quad (13)$$

where slicer in the above equation denotes a slicing operation. Then the digital BBPD (DBB) for PD2 226 is:

$$\Delta_{PDB,DBB} = \text{LUT}[v3(n-1), v3(n-½), v3(n)] \quad (14)$$

Where v3(n−½) is defined in the prior equation.

The LUT in the above equation is the same as Table 1. Instead of using baud rate MMPD/SLTPD equations such as (6) or (7), the above LUT, implementing Table 1 using v3(n−1), v3(n−½), v3(n) as inputs, becomes the implementation for PD2 226.

Digital Pseudo Quasi-Linear Phase Detector (QLPD) for PD2

As described above, the analog BBPD makes use of the transition sample generated with a transition clock. The BBPD might be extended to multi-level PDs which use additional timing samples.

The signal v(n−½−ψ) and v(n−½+ψ) are called the "early" and "late" data being produced from "early" and "late" data latches which are clocked with clocks which are offset from the transition clock by a phase −ψ and ψ, respectively, where 0<ψ<0.5.

For the DSP-based SERDES, additional sliced versions of signals w(i)(n) or z(i)(n) that might be used to implement a quasi-linear phase detector (QLPD) for PD2 226. In the embodiment shown in FIG. 2, DIF Bank B signals w(i)(n) or z(i)(n) emulates these early/late samples to allow for digital QLPD operation.

As an example, as shown in FIG. 2, where w(i)(n) are used as the inputs to PD2 226. Previously, v3(n−½) is defined as the following equation:

$$v3(n-½) = \text{slicer}[w(L/2)(n)] \quad (15)$$

However considering $$v3(n-½-ψ) = \text{slicer}[w(L/2-ψ_i)(n)] \quad (16)$$

$$v3(n-½+ψ) = \text{slicer}[w(L/2+ψ_i)(n)] \quad (17)$$

where $ψ_i$ represents an offset index in DIF bank B 302 which produces interpolated outputs corresponding with a desired phase shift of ψ. The $ψ_i$ is an integer index which refers to the offset from L/2 of two of a set of the interpolated output signals w(0), w(1) ... w(L−1) obtained from DIF bank B 302. Eq. (16) and Eq. (17) utilize the two interpolated signals selected from w(0), w(1) ... w(L−1) using the integer index offset $ψ_i$. In other words, the two interpolated signals w(L/2−$ψ_i$)(n) and w(L/2+$ψ_i$)(n) are selected from the set of interpolated signals w(0), w(1) ... w(L−1) by a controller (not shown) for slicing by det4 304, and signal w(L/2)(n) is also forwarded to det4 304 for slicing. From equations (15)-(17), the sliced signals, slice[w(L/2−$ψ_i$)(n)], slicer[w(L/2+$ψ_i$)(n)], and slicer[w(L/2)(n)], form input signals to PD2 226 of the secondary phase skew adaptation loop 224. In one exemplary embodiment, ψ=0.25 T and L=32, resulting in $ψ_i$=8 in Eq. (16) and Eq. (17). This means that signals w(24)(n) and w(8)(n), along with signal w(16), from DIF Bank B 302 are applied to det4 304 to produce signals v3(n−½+ψ) (per Eq. (17)), v3(n−½−ψ) (per Eq. (16)), and v3(n−½) (per Eq. (15)), respectively, as the inputs to PD2 226.

Referring to FIG. 2, the digital QLPD output for PD2 226 can be obtained as follows such that $v3(n-\frac{1}{2})$, $v3(n-\frac{1}{2}-\psi)$, $v3(n-\frac{1}{2}+\psi)$ are based on equations (15)-(17):

if ($v3(n-1)$==-1 & $v3(n-\frac{1}{2}-\psi)$==-1 & $v3(n-\frac{1}{2})$==-1 & $v3(n-\frac{1}{2}+\psi)$==-1 & $v3(n)$==1) DPDOUT=-2 else if ($v3(n-1)$==-1 & $v3(n-\frac{1}{2}-\psi)$==-1 & $v3(n-\frac{1}{2})$==-1 & $v3(n-\frac{1}{2}+\psi)$==1 & $v3(n)$==1) DPDOUT=-1 else if ($v3(n-1)$==-1 & $v3(n-\frac{1}{2}-\psi)$==-1 & $v3(n-\frac{1}{2})$==1 & $v3(n-\frac{1}{2}+\psi)$==1 & $v3(n)$==1) DPDOUT=1 else if ($v3(n-1)$==-1 & $v3(n-\frac{1}{2}-\psi)$==1 & $v3(n-\frac{1}{2})$==1 & $v3(n-\frac{1}{2}+\psi)$==1 & $v3(n)$==1) DPDOUT=2 else if ($v3(n-1)$==1 & $v3(n-\frac{1}{2}-\psi)$==1 & $v3(n-\frac{1}{2})$==1 & $v3(n-\frac{1}{2}+\psi)$==1 & $v3(n)$==-1) DPDOUT=-2 else if ($v3(n-1)$==1 & $v3(n-\frac{1}{2}-\psi)$==1 & $v3(n-\frac{1}{2})$==1 & $v3(n-\frac{1}{2}+\psi)$==-1 & $v3(n)$==-1) DPDOUT=-1 else if ($v3(n-1)$==1 & $v3(n-\frac{1}{2}-\psi)$==1 & $v3(n-\frac{1}{2})$==-1 & $v3(n-\frac{1}{2}+\psi)$==-1 & $v3(n)$==-1) DPDOUT=1 else if ($v3(n-1)$==1 & $v3(n-\frac{1}{2}-\psi)$==-1 & $v3(n-\frac{1}{2})$==-1 & $v3(n-\frac{1}{2}+\psi)$==-1 & $v3(n)$==-1) DPDOUT=2 else if ($v3(n-1)$==1 & $v3(n-\frac{1}{2})$==-1 & $v3(n)$==1) DPDOUT=1 else if ($v3(n-1)$==1 & $v3(n-\frac{1}{2})$==-1 & $v3(n)$==1) DPDOUT=1 else DPDOUT=0 where
DPDOUT is the output of PDB which now behaves as a digital QLPD,
a==b checks whether a is equal to b, and
& represents a logical AND operations.

Digital BBPD for PD1

Figure 3:
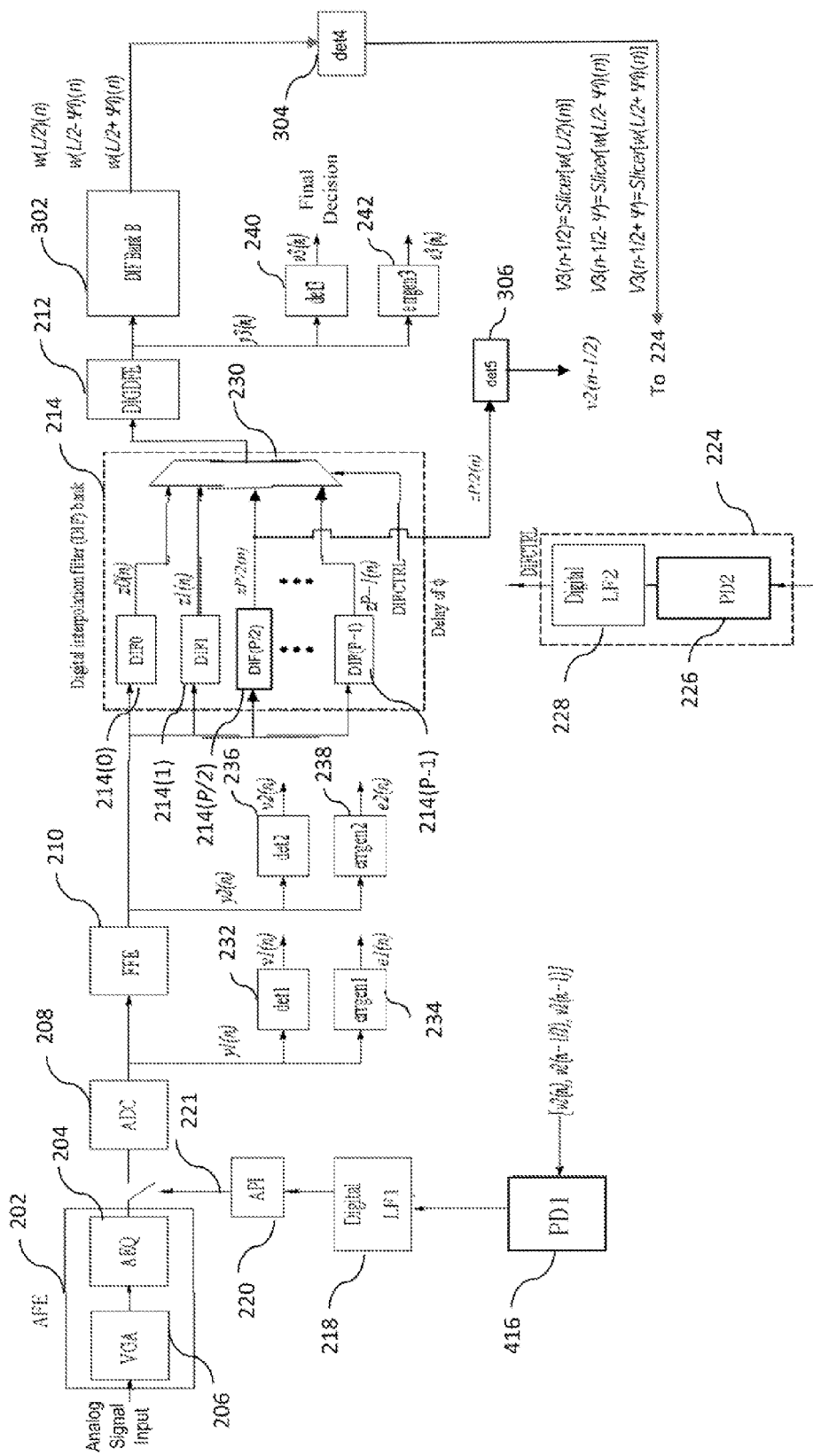
FIG. 3 shows a simplified block diagram of a DSP-based SERDES device shown in FIG. 1 with a digital BBPD used in a main CDR loop in accordance with embodiments.

FIG. 3 shows a simplified block diagram of a DSP-based SERDES device shown in FIG. 2 with a BBPD used in a main CDR loop. The difference between FIG. 2 and FIG. 3 is that, in FIG. 3, PD1 416 in the main CDR loop is a BBPD driven by FFE sliced outputs and FFE's interpolated sliced output signals. As shown in FIG. 3, PD1 416 is driven by FFE 210's sliced outputs, [$v2(n)$, $v2(n-\frac{1}{2})$, $v2(n-1)$], and FFE 210's interpolated sliced output signals, $v2(n-\frac{1}{2})$=slicer[$z(P/2)$], is generated by det5 306.

Referring to FIG. 3, if the P/2th signal of FFE 210 corresponds to the transition sample for $y2(n)$ i.e., $z(P/2)(n)$ corresponds to $y2(n-\frac{1}{2})$, and the P/2th signal of FFE 210 is sliced to produce the resulting decision $v2(n-\frac{1}{2})$ as follows $$v2(n-\tfrac{1}{2}) = \text{slicer}[z(P/2)(n)] \tag{18}$$

where the slicer in the above equation denotes the slicing operation. Then the digital BBPD (DBB) for PD1 416 is:

$$\Delta_{DBB} = \text{LUT}[v2(n-1), v2(n-\tfrac{1}{2}), v2(n-1)] \tag{19}$$

Again, the LUT in the above equation is the same as Table 1. Instead of using baud rate MMPD/SLTPD equations such as equations (6) or (7), the above LUT implementing Table 1 using $v2(n-1)$, $v2(n-\frac{1}{2})$, $v2(n)$ as inputs, becomes the implementation for PD1 416.

Weighted Average Phase Detection

Figure 4:
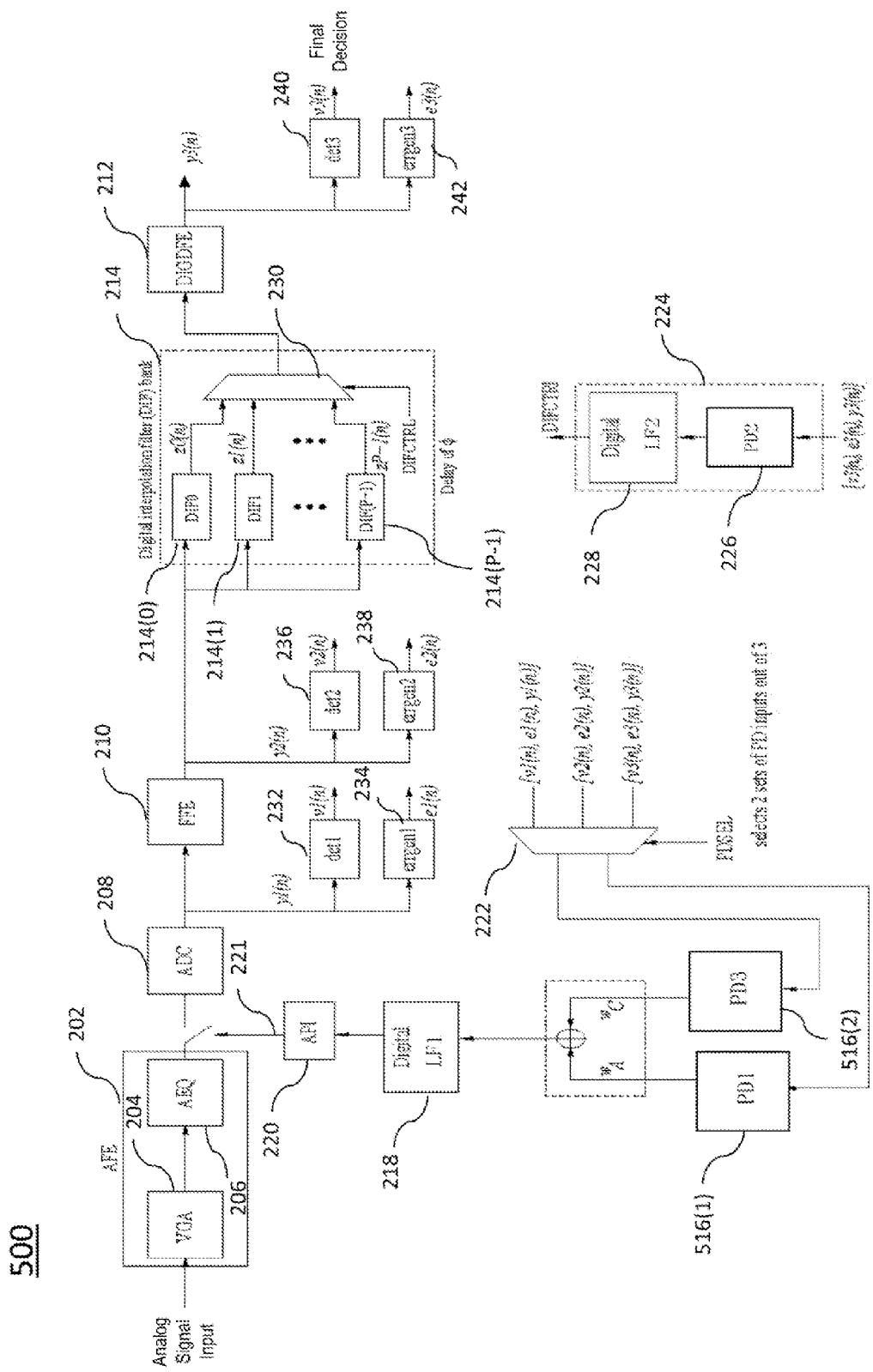
FIG. 4 shows a simplified block diagram of a DSP-based SERDES device shown in FIG. 1 with two weighted average phase detectors in a main CDR loop in accordance with embodiments.

FIG. 4 shows a simplified block diagram of a DSP-based SERDES device shown in FIG. 1 with two weighted averaged phase detectors in a main CDR loop where each phase detector receives signals from different stage equalization sources. The difference between FIG. 1 and FIG. 4 is that PD1 216 in FIG. 1 is replaced with two weighted phase detectors PD1 516(1) and PD3 516(2) in FIG. 4. As shown in FIG. 4 each phase detector, PD1 516(1) and PD3 516(2), obtains signal inputs from different equalization stages.

Note that here, PD1 516(1) is a normal main CDR phase detector, and PD3 516(2) is a similar phase detector to PD1 516(1) but based on signals that incur a higher latency. Outputs of PD1 516(1) and PD3 516(2) are weighted to produce a weighted phase detector output to drive the main CDR loop filter LF1 218. The input to LF1 218 is written as follows:

$$(\text{PD1}_{out})(w_A) + (\text{PD3}_{out})(w_B) \tag{20}$$

where $\text{PD1}_{out}$ and $\text{PD3}_{out}$ represent the outputs of PD1 516(1) and PD3 516(2), and $w_A$ and $w_B$ represent weights applied to phase error outputs from PD1 and PD3, respectively.

Figure 5:
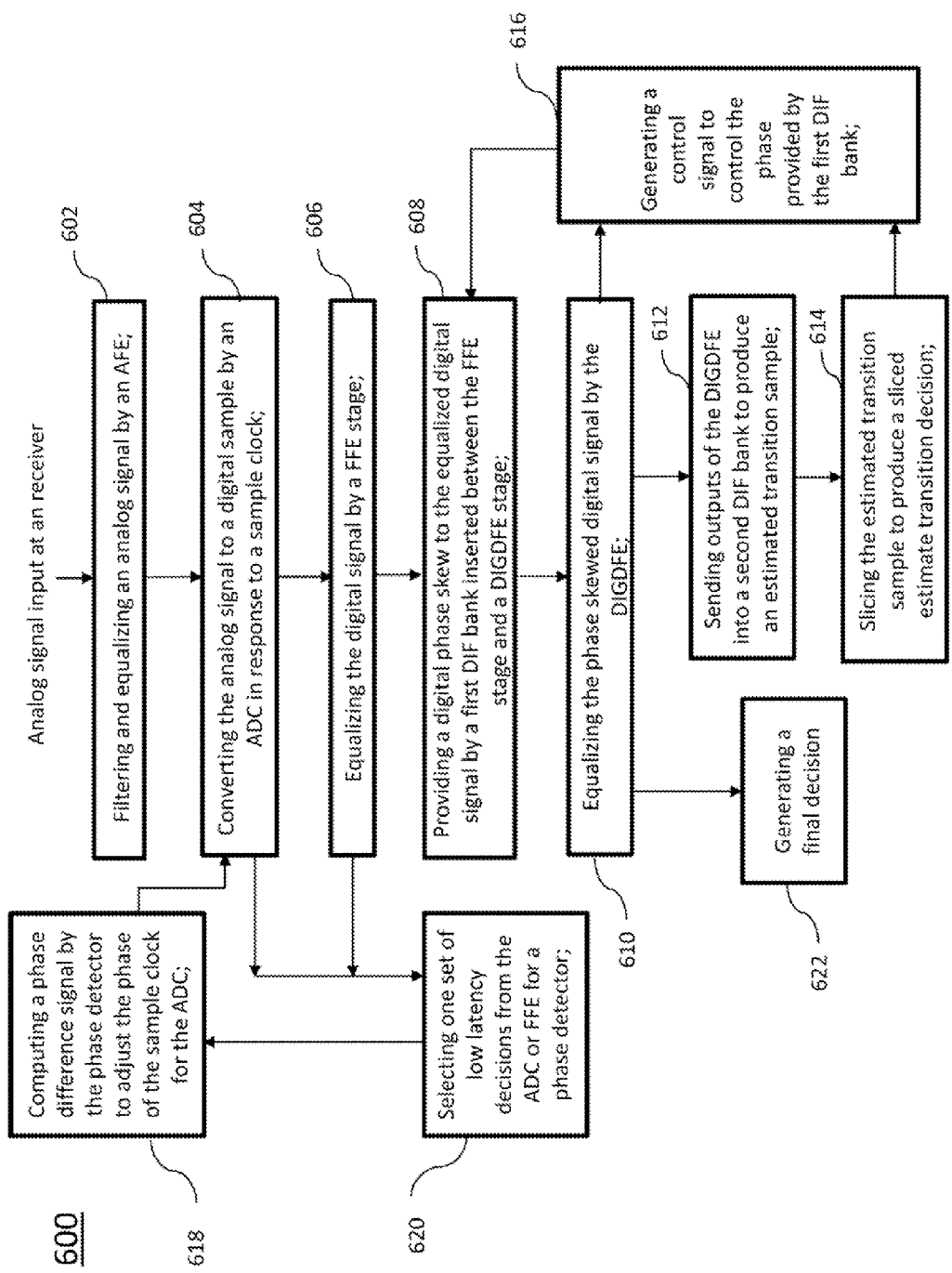
FIG. 5 shows a flowchart of an exemplary method for producing sample decisions with DSP-based SERDES device in accordance with embodiments.

FIG. 5 shows a flowchart of an exemplary method for producing sample decisions with a DSP-based SERDES device.

In the embodiment 600, when analog input waveform is arriving at a receiver, the DSP-based SERDES device starts to filter and equalize analog signals input by an AFE at step 602. The AFE might include a VGA followed by an AEQ. The VGA and AEQ together form the AFE which provides for gain control as well as some level of analog equalization/higher frequency peaking or group delay compensation. At step 604, an ADC followed the AFE produces quantized or digital samples at a symbol or baud rate T. Those finite precision samples are subsequently processed further for equalization using a FFE (step 606) and DIGDFE (step 610). At step 608, digital phase skew values are produced by a first DIF bank inserted between the FFE and the DIGDFE. At step 610, the phase skewed digital signal generated by the FFE and the first DIF bank is equalized by the DIGDFE and outputs of the DIFDFE then form a final decision at step 622. At step 612, referring to FIG. 2, the outputs of the DIFDFE is sent into a second optional DIF bank producing an estimate transition sample for the DIGDFE. Then the estimated transition samples are sliced by a slicer to generate a sliced estimated transition decision or a filtered decision at step 614. At step 616, the outputs of the DIGDFE and the sliced estimated transition decision from the second DIF bank are sent back to a secondary phase skew adaptation loop that generates a control signal to control the first DIF bank. Here, if a first phase detector in the secondary phase skew adaption loop is a bang-bang phase detector (BBPD), a lookup table of the BBPD is applied to the resulting decision inputting into the BBPD. If the first phase detector in the secondary phase skew adaption loop is a digital quasi-linear phase detector (QLPD), the resulting decision depends on the conditions of the estimated transition, early/late decisions described above. At step 618, a main CDR loop, one set of decisions from the ADC, FFE, and DIGDFE is selected by a multiplexor and input into a first phase detector. In one embodiment, the one set of the decisions may be selected from low latency decisions from the ADC and FFE by the multiplexor and input into the first phase detector. The first phase detector calculates a phase difference signal to adjust the phase of the sample clock for the ADC, at step 620.

Figure 6:
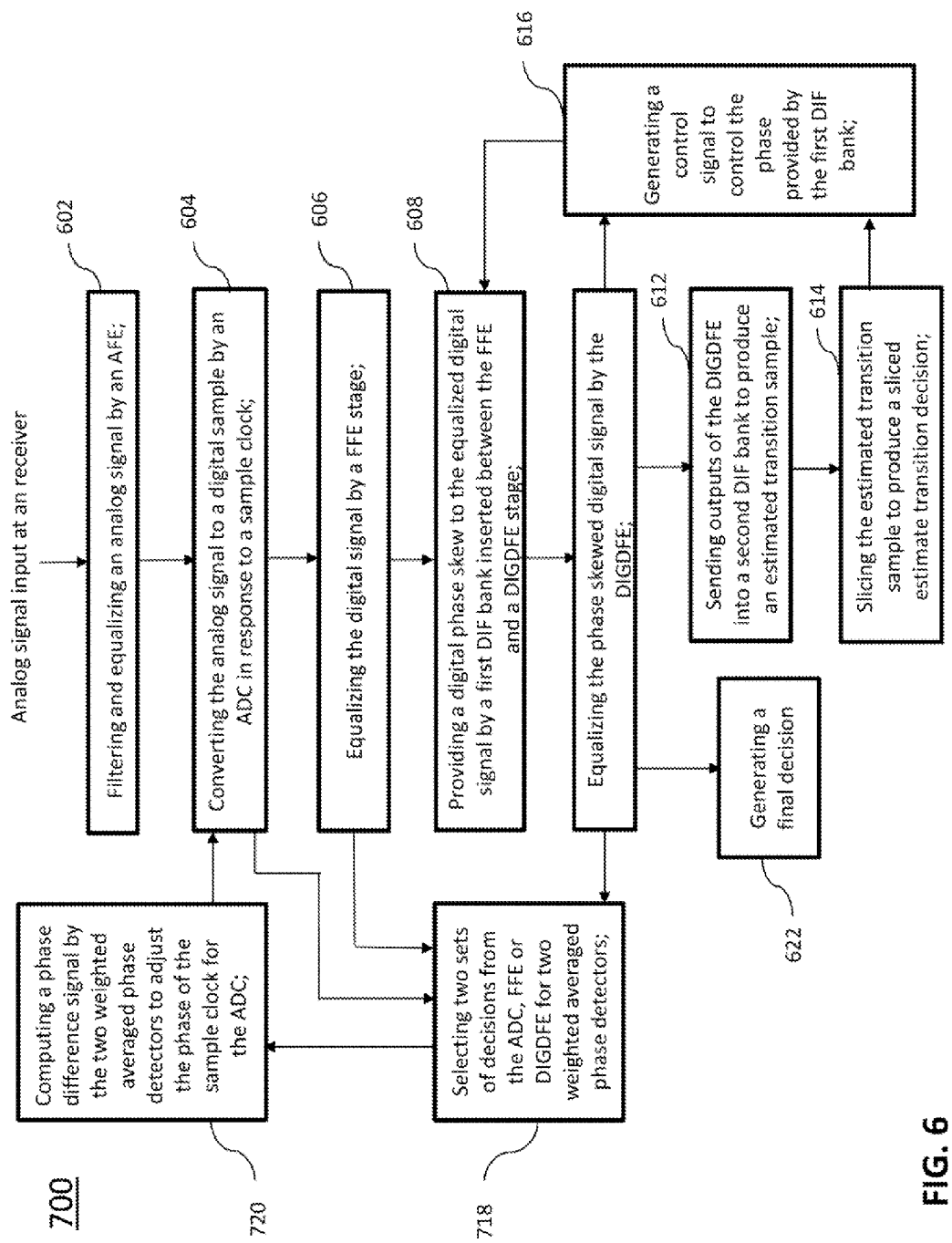
FIG. 6 shows a flowchart of an exemplary method for producing sample decisions with a DSP-based SERDES device having two weighted average phase detectors in a main CDR loop in accordance with embodiments.

FIG. 6 shows a flowchart of an exemplary method for producing sample decisions with a DSP-based SERDES device having two weighted averaged phase detectors in a main CDR loop.

The difference between the embodiment 600 and embodiment 700 is that, at step 718, two sets of decisions from the ADC, FFE and DIGDFE are selected and each set is forwarded to a corresponding phase detector in two weighted averaged phase detectors, referring to FIG. 4. At step 720, a phase difference signal is computed by the two weighted averaged phase detectors to adjust the phase of the sample clock for the ADC.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, or apparatus.

While the exemplary embodiments have been described with respect to processes of circuits, including possible implementation as a single integrated circuit, a multi-chip module, a single card, or a multi-card circuit pack, the embodiments are not so limited. As would be apparent to one skilled in the art, various functions of circuit elements may also be implemented as processing blocks in a software program. Such software may be employed in, for example, a digital signal processor, micro-controller, or general purpose computer.

The use of figure numbers or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to an manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

No claim element herein is to be construed under the provisions of 35 U.S.C. §112, sixth paragraph, unless the element is expressly recited using the phrase "means for" or "step for."

It will be further understood that various changes in the details, materials, and arrangements of the parts which have been described and illustrated in order to explain the nature of described embodiments may be made by those skilled in the art without departing from the scope as expressed in the following claims.

We claim:

1. A method for producing sample decisions with a digital signal processing-based SERDES device, the method comprising the steps of:

converting a received analog signal to a digital signal by an analog to digital converter in response to a sample clock;

equalizing the digital signal by a feed forward equalizer followed by a decision feedback equalizer;

selecting as inputs for a first phase detector either the digital signal from the analog to digital converter or the equalized signal from the feed forward detector;

computing a phase difference signal by the first phase detector;

adjusting, in response to the phase difference signal, a phase of the sample clock applied to the analog to digital converter;

providing a phase skew to an equalized digital signal from the feed forward equalizer by a first interpolation filter bank inserted between the feed forward equalizer and the decision feedback equalizer and a second interpolation filter bank, following the decision feedback equalizer;

generating a control signal to control the phase skew provided by the first interpolation filter bank by a phase skew adaptation loop using an output of the decision feedback equalizer, and wherein the phase skew adaptation loop includes a second phase detector configured to receive inputs of the phase skew adaptation loop from the decision feedback equalizer and the second interpolation filter bank; and slicing the output of the decision feedback equalizer to produce a data signal decision.

2. The method of claim 1 comprising:

producing estimate transition samples for the feed forward equalizer by a second interpolation filter bank; and slicing the estimate transition samples by a slicer;

wherein the phase skew adaptation loop additionally uses the sliced estimate transition samples to generate the control signal.

3. The method of claim 1 comprising:

configuring the second interpolation filter bank to emulate the equalized digital sample from the decision feedback equalizer to obtain an estimated transition sample after the decision feedback equalizer.

4. A device comprising:

an analog to digital converter configured to produce digital samples of an analog input signal;

a feed forward equalizer and a decision feedback equalizer, connected in cascade, configured to equalize the digital samples from the analog to digital converter;

a clock generation device for coupling a sampling clock, having a phase controlled by a control signal, to the analog to digital converter;

a first phase detector configured to provide the control signal to the clock generation device;

a multiplexor configured to select as inputs for the first phase detector either the digital signal from the analog to digital converter or the equalized signal from the feed forward equalizer;

a first interpolation filter bank, inserted between the feed forward equalizer and decision feedback equalizer, configured to provide a skew from the phase forward equalizer to the decision feedback equalizer;

a second interpolation filter bank, following the decision feed back equalizer; and a phase skew loop, responsive to the decision feedback equalizer, configured to adjust the phase skew provided by the first interpolation filter bank, wherein the phase skew loop includes a second phase detector configured to receive inputs of the phase skew loop from the decision feedback equalizer and the second interpolation filter bank.

5. The device of claim 4, wherein the second interpolation filter bank is configured to emulate the equalized digital sample from the decision feedback equalizer to obtain an estimated transition sample after the decision feedback equalizer.

6. The device of claim 5 wherein the second interpolation filter bank emulates a transition sample of the equalized digital sample from the decision feedback equalizer with 0.5 T phase offset, where T is one symbol period.

7. The device of claim 4 wherein the second phase detector is a bang-bang phase detector.

8. The device of claim 7 wherein an output of the bang-bang phase detector is a function of $v3(n-1)$, $v3(n-\frac{1}{2})$, $v3(n)$, where $v3(n-1)$ and $v3(n)$ are sliced samples obtained from the decision feedback equalizer at symbol time n−1 and n, respectively, and $v3(n-\frac{1}{2})$ is a sliced estimated transition sample obtained from the second interpolation filter bank at sampling time, n−½, offset 0.5 T from the symbol time n, where T is one symbol period.

9. The device of claim 4 wherein the second phase detector is a digital quasi-linear phase detector.

10. The device of claim 9 wherein an output of the quasi-linear detector depends on conditions of sliced transition samples $v3(n-\frac{1}{2})$, $v3(n-\frac{1}{2}-\psi)$, $v3(n-\frac{1}{2}+\psi)$, where $v3(n-\frac{1}{2}-\psi)$ and $v3(n-\frac{1}{2}+\psi)$ are an early/late sliced estimated transition samples comparing to the estimated transition sample $v3(n-\frac{1}{2})$, respectively, with a desired phase shift $-\psi$ and $+\psi$, respectively, and $v3(n-\frac{1}{2})$, $v3(n-\frac{1}{2}-\psi)$, $v3(n-\frac{1}{2}+\psi)$ follow equations of $v3(n-\frac{1}{2})$=slicer$[w(L/2)(n)]$, $v3(n-\frac{1}{2}-\psi)$=slicer$[w(L/2-\psi_1)(n)]$, and $v3(n-\frac{1}{2}+\psi)$=slicer$[w(L/2+\psi_1)(n)]$, where the slicer denotes a slicing operation, the $\psi_1$ represents an offset index in the second interpolation filter bank which produces interpolated outputs corresponding to the desired phase shift of $\psi$, $w(L/2)(n)$ is a signal from the second interpolation filter bank having a phase offset of 0.5 T from a signal applied to the second interpolation filter bank from the decision feedback equalizer, and $w(L/2-\psi_1)(n)$ and $w(L/2+\psi_1)(n)$ are the L/2th signals of the second interpolation filter bank having the offset index $-\psi_1$ and $+\psi_1$, respectively, where L and $\psi_1$ are integers, and T is one symbol period.

11. The device of claim 4 wherein the first interpolation filter bank includes a set of interpolation filters connected in parallel, each interpolation filter configured to process the equalized digital sample from the feed forward equalizer to generate a plurality of phase skew signals; and a multiplexor configured to select one of the phase skew signals from the set of the interpolation filters and forward the selected one of the phase skew signals to the decision feedback equalizer, wherein the multiplexor is controlled by a control signal generated by the phase skew loop.

12. The device of claim 11 wherein the interpolation filter is a finite impulse response filter.

13. The device of claim 12 wherein an ith output $z(i)(n)$ of the first interpolation filter bank is computed by $$z(i)(n) = \sum_{l=0}^{M-1} g(i)(l)x(n-l)$$

where $g(i)(l)$ represents the lth coefficient of the ith interpolation filter.

14. The device of claim 4 wherein the first interpolation filter bank has at least three interpolation filters operating simultaneously.

15. The device of claim 4 wherein the phase skews are fractional values between 0 and T, where T is one symbol period.

16. The device of claim 4 wherein the first phase detector is a digital bang-bang phase detector having an output that is a function of inputs $v2(n-1)$, $v2(n-\frac{1}{2})$, and $v2(n)$, where $v2(n-1)$ and $v2(n)$ are a sliced samples obtained from the feed forward equalizer at symbol time n−1 and n, respectively, and $v2(n-\frac{1}{2})$ is a sliced transition sample obtained from the first interpolation filter bank.

17. The device of claim 16 wherein the sliced transition sample $v2(n-\frac{1}{2})$ is a sliced signal of $z(P/2)(n)$, where $z(P/2)(n)$ is a signal from the first interpolation filter bank having a phase offset of 0.5 T with respect to a signal applied to the first interpolation filter bank from the feed forward equalizer, P is an integer, and T is one symbol period.

18. The device of claim 4 wherein the clock generation device includes a phase interpolator.

19. The device of claim 4 wherein the control signal is a phase or frequency control signal.

20. A non-transitory machine-readable medium, having encoded thereon program code, wherein, when the program code is executed by a machine, the machine implements a method for producing sample decisions, the method comprising the steps of:

converting a received analog signal to a digital signal by an analog to digital converter in response to a sample clock;

equalizing the digital signal by a feed forward equalizer followed by a decision feedback equalizer;

selecting as inputs for a first phase detector either the digital signal or the equalized signal from the feed forward equalizer;

computing a phase difference signal by the first phase detector;

adjusting, in response to the phase difference signal, a phase of the sample clock applied to the analog to digital converter;

providing the phase skew to an equalized digital signal from the feed forward equalizer by a first interpolation filter bank inserted between the feed forward equalizer and the decision feedback equalizer and a second interpolation filter bank, following the decision feedback equalizer;

generating a control signal to control the phase skew provided by the first interpolation filter bank by a phase skew adaptation loop using an output of the decision feedback equalizer and wherein the phase skew adaptation loop includes a second phase detector configured to receive inputs of the phase skew adaptation loop from the decision feedback equalizer and the second interpolation filter bank; and slicing the output of the decision feedback equalizer to produce a data signal decision.

* * * * *